Figure 1:
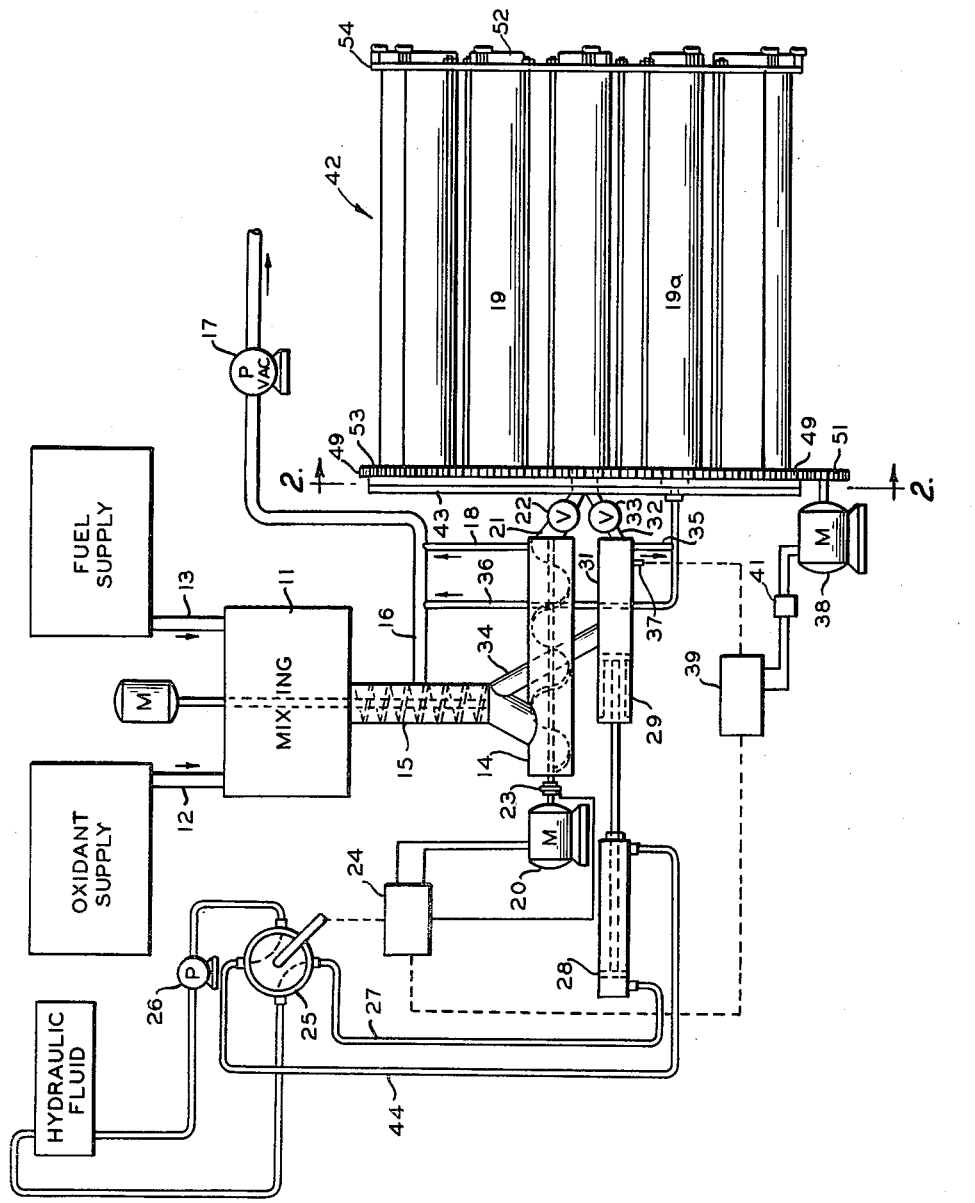

June 7, 1960

B. R. ADELMAN 2,939,176

MOLDING OF PROPELLANTS

Filed Dec. 30, 1954

2 Sheets-Sheet 1

INVENTOR.
B. R. ADELMAN

BY Hudson and Young

ATTORNEYS

June 7, 1960  B. R. ADELMAN  2,939,176
MOLDING OF PROPELLANTS

Filed Dec. 30, 1954  2 Sheets-Sheet 2

INVENTOR.
B. R. ADELMAN
BY Hudson and Young
ATTORNEYS

United States Patent Office 2,939,176
Patented June 7, 1960

2,939,176
MOLDING OF PROPELLANTS

Barnet R. Adelman, Waco, Tex., assignor to Phillips Petroleum Company, a corporation of Delaware Filed Dec. 30, 1954, Ser. No. 478,804

5 Claims. (Cl. 18—30)

This invention relates to the manufacture of propellants. In one of its more specific aspects, it relates to the manufacture of large, case-bonded propellant grains. In another of its more specific aspects, it relates to a combination of extrusion and injection molding of propellants so as to exclude undesired free space from between the propellant and the mold.

Two principal methods of manufacture of propellants presently used are the solvent process and the hot rolling process. Each of these processes possess certain advantages as well as certain disadvantages. In the solvent process, the ingredients of the propellant are mixed and reduced to colloidal state in the presence of a volatile solvent. The resulting composition is subsequently extruded into the form of tubes, the tubes being then extruded into the form of grains, and dried in finished form. This method is relatively inexpensive, and the hazards of accidental explosions are reduced by diluting the nitroglycerine, when used, with acetone before mixing it with nitrocellulose. The mixing is carried out at fairly low temperatures. The main disadvantage of the solvent process resides in the extremely slow drying of the extruded grains, for the length of the drying period increases roughly as the square of the web thickness. Thus, grains which are practicable to prepare by this process are necessarily limited to small webs, and even so, the amount of powder in process at any one time may amount to several weeks production. Furthermore, the final size and shape of the grain cannot be controlled with close tolerances, thereby necessitating a large quantity of rejects which must be reworked, with a consequent increase in cost and amount of material in process.

Although the hot rolling process is more hazardous than the solvent process, it requires less time. It involves mixing a water emulsion of nitroglycerine, when used, and other ingredients with moist nitrocellulose. The mixture is then prerolled in hot differential rolls, held in a dry house for a period of time and then rolled in two stages into sheets. The sheets are cut and dry extruded into the desired shape and size. Grains which are several inches in diameter have been extruded by this process since there is nothing inherent in the process to restrict the upper limit of the grain size. Accurate control of the grain dimensions is possible and any rejected material which is reworkable may be easily re-extruded. However, even this process is unduly complicated and time consuming.

Neither of the above methods of propellant molding is applicable in the preparation of case bonded composite propellant grains. Composite propellants are composed of a solid oxidizing agent and a solid reducing agent held together by a binding agent. The binding agents are either thermoplastic or thermosetting non-explosive plastic materials. The mixed propellant materials are usually compression molded or extruded into short lengths. Long sticks of propellant may be extruded, or prepared by cementing together a number of the short grains. These propellants are usually case-bonded by preparing a grain slightly smaller than the case and bonding the grain to the case by a bonding agent such as asphalt or rubber. At present, grains of the order of 12 to 15 inches in diameter, both solid and perforated, have been prepared. The production of larger sizes is limited by the availability of larger presses and by the desirability of using larger presses if available.

Use of an extrusion method of molding propellant grains is quite attractive because of its low energy requirements. However, when a viscous material is used as the binder for an oxidant in such propellants, extrusion methods are not practical because it is not possible to put sufficient pressure on the composite mass to effect its final placement in the mold so that voids are eliminated from the propellant and between the propellant and the mold.

The following objects will be attained by the various aspects of the invention.

Figure 2:
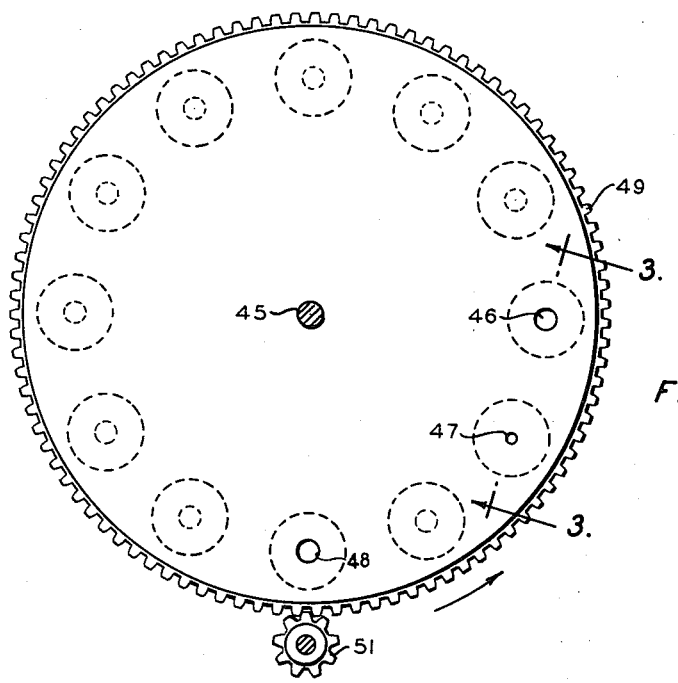
Figures 3, 4:
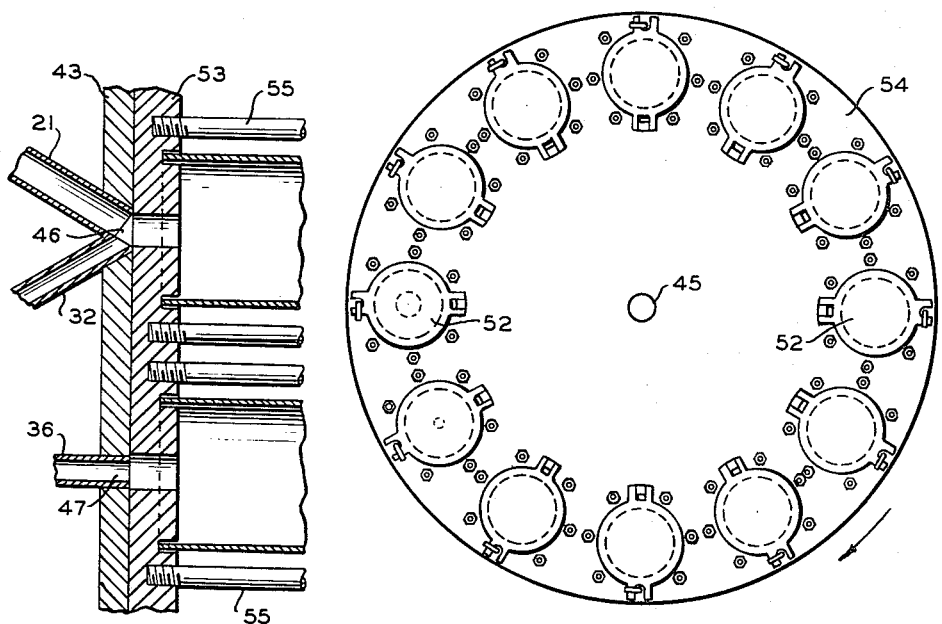

An object of this invention is to provide an improved method for molding solid propellants. Another object of this invention is to provide an improved method for preventing voids in a molded solid propellant. Another object of the invention is to provide an improved method for high pressure molding of solid propellants. Another object of the invention is to provide an improved method for producing large diameter propellant grains. Another object of the invention is to provide an improved method for producing propellant grains when using a viscous binder. Other and further objects of this invention will be apparent to those skilled in the art upon study of the accompanying disclosure and drawing wherein:

Figure 1 is a schematic illustration of a preferred modification of the invention, Figure 2 is a view along lines 2—2 of Figure 1, Figure 3 is a view along lines 3—3 of Figure 2, and Figure 4 is a view of the loading end of the molds.

Broadly speaking, this invention resides in a combination of extrusion and injection methods in the preparation of case-bonded propellant grains generally of large and specific size. A composite mixture of polymer fuel and oxidant is extruded into the mold under relatively low pressure to obtain a relatively uniform adaptation of the mass to the contour of the mold. The extruder is vented so as to permit the escape of gaseous materials therefrom and so as to ensure the substantial absence of gaseous materials in the mold. A second portion of the same composite of oxidant and fuel is introduced into an injector from which it is moved into the mold at a relatively high pressure, which results in compacting the material which has been extruded into the mold and also in removing any void spaces which have been permitted to form during the extrusion feeding of the composite mass. Any gaseous materials present in the composite mass are vented from the mold.

I have discovered a novel molding technique for the manufacture of solid propellant charges and particularly large diameter propellant grains which are not generally producible by extrusion molding, and which might otherwise not be capable of production. By carrying out this improved molding process, it is possible to utilize a high pressure injector which has a considerably smaller capacity than would normally be necessary if the total composite fuel and oxidant mass were introduced into the mold by means of an injector. This permits the major portion of the molding to be accomplished by means of apparatus which requires a much lower power supply than does a high pressure injector.

The method of this invention is broadly applicable to the molding of any of the solid propellant compositions which are used in the formation of propellant grains. Any number of propellant compositions have been used heretofore in the formation of large grain propellants. One of the more recent types which has become attractive in the formation of such propellant grains is one which contains a major proportion of an oxidizer, for example from 50 to 95 weight percent of the total, a minor proportion of a rubbery binder and a very small amount of a burning rate catalyst. Ammonium nitrate or a mixture of ammonium nitrate and ammonium perchlorate is particularly useful as an oxidizer in conjunction with a binder made up of a copolymer of a diene and a polymerizable heterocyclic nitrogen compound, such as an alkyl substituted vinylpyridine. Additional materials which are ordinarily admixed with the oxidizer, binder and burning rate catalyst, include a reinforcing agent, a plasticizer and curatives.

With reference to the drawing and particularly to Figure 1, the various constituents of the propellant are introduced into mixer 11 through oxidant inlet 12 and fuel inlet 13. The propellant constituents are mixed generally at a low temperature such as in the range of 60 to 160° F. so as to obtain uniform dispersion of all of the materials therein. The mixing procedure is conducted by operations well known in the art and will not be discussed in detail here. After the mixing operation, whereby the constituents are incorporated into a moldable propellant composition, the composition is passed to extruder 14 through conduit 15. The mixture is partially deaerated in conduit 15 through vacuum vent line 16 operated by vacuum pump 17. Extruder 14 is vented through conduits 18 and 16 so as to permit at least a portion of any gaseous material remaining to escape from the composite mass in the extruder. Extruder 14 can be any conventional extrusion mechanism which can be provided with a screw conveyor or suitable means operated by a power source such as motor 20 for economically moving the mix of propellant composition into mold 19 through conduit 21, containing check valve 22, at a pressure in the range of from 10 to 5000 p.s.i.g. The lower pressure will be used if the binder is a liquid while the higher pressure is used if the binder is a solid at the time of extrusion. The feed of propellant material through conduit 21 is continued until mold 19 is substantially filled to capacity. At this point, the back pressure resulting from the filling of the mold 19 acts on torque convertor 23 located in the extruder drive shaft assembly so as to actuate switching means 24 so as to stop motor 20 and move valve 25 and cause pump 26 to exert pressure on hydraulic line 27 and hydraulic piston 28 so as to cause piston 29 to force propellant mixture in injector cylinder 31 into mold 19 through conduit 32 containing check valve 33. Injector cylinder 31 is filled from conduit 15 through conduit 34 simultaneously with feeding of the material to extruder 14. Any remaining gaseous material in injector cylinder 31 is vented through vent lines 35, 36 and 16. The propellant material is injected from injector cylinder 31 to mold 19 under a pressure in the range of 100 to 50,000 p.s.i.g. and once again, selection of the specific injection pressure will depend upon the specific form of the binder at the time of the injection, a propellant composition utilizing a liquid binder requiring less pressure for injection than a composition utilizing a solid binder. This step of injection of a small portion of the propellant mix into the mold pressurizes the entire propellant mix and results in increasing the density of the propellant mix in mold 19 and prevents the occurrence of any voids in the propellant mix.

When the predetermined maximum compression pressure has been obtained by the operation of piston 29 in injection cylinder 31, pressure-sensitive element 37 actuates motor 38 through pressure sensitive switch 39 and limit switch 41 so as to rotate mold drum 42 thus sealing mold 19 against plate 43 and bringing the next mold into position in front of the inlet of conduits 21 and 32. Mold 19a, during the period of filling mold 19, is deaerated through lines 36 and 16. Actuation of pressure switch 39 by pressure sensitive element 37 also operates switch 24 so as to start motor 20 and to reverse the flow of hydraulic liquid so that pump 25 places pressure on hydraulic line 44 and piston 28 so as to return pistons 28 and 29 to retracted position.

Mold drum 42 is comprised of a rotatable rack adapted to support molds 19 in position around the periphery of the drum. The mold drum rotates about an axle 45 and is held securely against plate 43. Plate 43 has opening 46 for filling the mold, opening 47 for deaerating the mold prior to being filled, and opening 48 which facilitates removal of the filled mold at the end of the operating cycle. The drum is caused to rotate by gear wheel 49 located around the periphery of the drum in contact with gear wheel 51 which is actuated by motor 38. The molds are removed from the rack by opening the quick-opening covers 52. The covers 52 hold the molds into sealing contact with plate 53 which forms one end of the mold drum. The quick opening covers 52 are secured to plate 54 which forms the opposite end of the mold drum and plates 53 and 54 are held together by support rods 55.

Switch 24 is a conventional, commercially available double-pole, double-throw switch adapted to be operated in one direction by torque converter 23 and adapted to be operated in the other direction by pressure switch 39. Switch 24 actuates valve 25 by direct linkage, or by means of a servomotor, or by other well known means. Pressure switch 39 can be a conventional, commercially available pressure switch operated by a Bourdon tube, bellows or other pressure sensitive device. Limit switch 41 can be a conventional, commercially available limit switch adapted so as to operate motor 38 sufficiently to move mold rack 42 the required distance to move mold 19a into the position occupied by mold 19 as shown in Figure 1.

The propellant composition maintains its compressed condition during curing which is accomplished at a temperature below 250° F., usually in the range of 150° F. to 200° F. Loading of the mold and curing of the propellant composition, molded in this fashion, results in a propellant which does not pull away from the shell of the mold.

Better understanding of this invention will be obtained upon reference to the following example, which is presented for the purpose of exemplification of this invention and should not be used to unduly limit the invention.

*Example*

A mixture of 75 parts of ammonium nitrate; 21.91 parts of a 90/10 ratio of butadiene/2-methyl-5-vinyl-pyridine copolymer; 4.38 parts of a furnace black; 1.51 parts of benzotrichloride; .36 part of Butyl-Eight (dithiocarbamate); .31 part of sulfur; and .91 part of zinc oxide, is mixed in mixer 11 to obtain uniform distribution of the constituents. That mixture is passed to extruder 14 where trapped gaseous material is substantially removed and the mixture is then transmitted to mold 19 at a pressure of 1500 p.s.i.g. A second portion of the propellant composition is introduced into injector cylinder 31 from which it is passed through conduit 32 into mold 19 at a pressure of 16,000 p.s.i.g., while permitting gases compressed from the propellant mass to escape through conduit 35. The mold is removed from the mold drum when the drum has rotated so that the mold has reached the position for removal and the propellant is then cured at a temperature of 176° F. for 15 hours to form a propellant solidly compressed against the wall of the mold.

Variations and modifications are possible within the scope of the disclosure of the present invention, the essence of which is the provision of a novel combination of extrusion and injection methods for forming solid propellant charges of maximum density with a minimum requirement of power.

That which is claimed is:

1. The process of producing case-bonded, solid propellants which comprises introducing into a mixing zone a solid oxidant and a rubbery binder material comprising a copolymer of butadiene and 2-methyl-5-vinylpyridine; mixing said oxidant and binder so as to obtain uniform distribution thereof; introducing a first portion of a resulting solid mixture into an extruding zone at a temperature in the range of about 60 to about 160° F.; deaerating said extrusion zone; deaerating a first of a plurality of molding zones; extruding said mixture into said deaerated molding zone in an amount sufficient to fill substantially said molding zone at a pressure in the range of about 10 to about 5000 p.s.i.g.; introducing a second portion of said mixture into an injection zone; deaerating said injection zone; injecting said second portion of said mixture into said molding zone at a temperature in the range of about 60 to about 160° F. and at a pressure in the range of about 100 to about 50,000 p.s.i.g.; deaerating a second molding zone; replacing said first molding zone with said second molding zone while maintaining molding pressure of about 100 to about 50,000 p.s.i.g. on said first molding zone for at least the time required to fill said second molding zone; reducing the pressure on said first molding zone to atmospheric pressure; and introducing said first molding zone into a curing zone maintained at a curing temperature of about 150 to about 200° F. for a time sufficient to cure said binder.

2. The process of claim 1 wherein the oxidant is ammonium nitrate, the binder is a copolymer of butadiene and methyl vinylpyridine and the oxidant is from 50 to 95 weight percent of the resulting mixture.

3. A device for molding propellants which comprises means for mixing a solid oxidant and a rubbery binder material; a rotatable rack adapted to support a plurality of molds about its periphery; a plurality of molds, each having an open end and a closed end, positioned in said rack; a fixed plate positioned adjacent said rack in sealing contact with the open ends of said molds, and having a passageway therethrough in communication with the open end of a first mold and a second passageway therethrough in communication with the open end of a second mold; deaerating means in communication with said first passageway; extrusion means operatively connected to said mixing means and said second passageway and adapted so as to introduce propellant mixture to said second mold so as to substantially fill said second mold; injection means operatively connected to said mixing means and said second passageway and adapted so as to inject propellant mixture into said substantially filled second mold at a pressure sufficient to compact said mixture within said second mold; means adapted so as to deaerate said extrusion means and said injection means; means adapted so as to stop said extrusion means and to start said injection means when a predetermined back pressure is exerted upon said extrusion means; means adapted so as to stop said injection means when a predetermined back pressure is exerted upon said injection means; means actuated by the injection back pressure to rotate said rack so as to move said second mold out of contact with said second passageway while maintaining the open end of said mold in sealing contact with said plate and to move said first mold into contact with said second passageway while maintaining said first mold in sealing contact with said plate; and means to remove said second mold from said rack after rotation of said rack.

4. A device for molding propellants which comprises mixing means adapted so as to mix a solid oxidant and a binder; a rotatable rack adapted to support a plurality of molds around its periphery; a plurality of molds, each having a closed end and an open end, positioned in said rack; a fixed plate positioned adjacent said rack in sealing contact with the open ends of said molds having a passageway therethrough in communication with one of said molds and with a deaerating means, and a second passageway therethrough in communication with another of said molds and with means for filling said molds; a deaerating means; means adapted to rotate said rack so as to deaerate one of said molds; means adapted to rotate said rack so as to move said deaerated mold into position for filling with propellant mixture, to move a filled mold out of position for filling, and to move a mold into position for deaerating while maintaining the open ends of said molds in sealing contact with said plate so as to maintain molding pressure on said filled mold; extrusion means operatively connected to said mixing means and adapted so as to substantially fill said mold in position for filling; means for deaerating said extrusion means; injection means operatively connected to said mixing means and adapted so as to inject propellant mixture into said substantially filled mold at a pressure sufficient so as to compact said mixture within said mold; means for deaerating said injection means; a first control means adapted so as to stop said extrusion means when the mixture within the mold exerts a predetermined back pressure upon the extrusion means and to start said injection means; a second control means adapted so as to stop the injection means, to actuate the means adapted so as to move the filled mold out of filling position, the deaerated mold into filling and a mold into deaerating position, and to start the extrusion means when the mixture within the mold exerts a predetermined back pressure upon the injection means; and means to release the pressure on the filled mold and to remove said filled mold after rotation of said rack.

5. The process of case bonding solid propellants which comprises mixing a solid oxidant and a rubbery binder material comprising a copolymer of butadiene and 2-methyl-5-vinylpyridine in a mixing zone; introducing a first portion of a resulting solid mixture into the first of a plurality of molding zones in an amount sufficient to fill substantially said molding zone and to form a solid propellant grain therein at a temperature in the range of about 60 to about 160° F.; introducing a second portion of said mixture into said molding zone at a pressure in the range of about 100 to about 50,000 p.s.i.g. and in an amount sufficient to compact said mixture in said molding zone while removing gaseous material therefrom; maintaining molding pressure of about 100 to about 50,000 p.s.i.g. on said first molding zone while repeating said molding operation on a second molding zone; reducing the pressure on said first molding zone to substantially atmospheric pressure after at least a molding step has been completed on a second molding zone; and introducing said first molding zone containing said propellant mixture into a curing zone maintained at a temperature in the range of about 150 to about 200° F. for a time sufficient to cure said propellant mixture.

References Cited in the file of this patent
UNITED STATES PATENTS

| 1,308,347 | Du Pont | July 1, 1919 |
| 2,351,774 | McGowen | June 20, 1944 |
| 2,372,177 | Conner | Mar. 27, 1945 |
| 2,478,013 | Roddy | Aug. 2, 1949 |
| 2,505,540 | Goldhard | Apr. 25, 1950 |
| 2,777,164 | Strahm | Jan. 15, 1957 |

FOREIGN PATENTS

| 655,585 | Great Britain | July 25, 1951 |
| 1,064,777 | France | Dec. 30, 1953 |

OTHER REFERENCES

Report entitled "Jet Propulsion," prepared by GALCIT for the Air Technical Service Command, 1946, page 271.